United States Patent

Saitoh

[11] Patent Number: 5,805,883
[45] Date of Patent: Sep. 8, 1998

[54] INTERRUPT PROCESS DISTRIBUTING SYSTEM

[75] Inventor: Hiroyuki Saitoh, Kawasaki, Japan

[73] Assignee: Fujitsu Limited, Kawasaki, Japan

[21] Appl. No.: 815,071

[22] Filed: Mar. 11, 1997

Related U.S. Application Data

[63] Continuation of Ser. No. 300,942, Sep. 6, 1994, abandoned.

[30] Foreign Application Priority Data

Mar. 8, 1994 [JP] Japan ..................... 6-036660

[51] Int. Cl.$^6$ .............. G06F 15/16; G06F 13/24
[52] U.S. Cl. ............. 395/675; 395/733; 395/736; 395/672
[58] Field of Search ................. 395/733, 736, 395/739, 672, 675

[56] References Cited

U.S. PATENT DOCUMENTS

| | | | |
|---|---|---|---|
| 4,709,324 | 11/1987 | Kloker | 395/375 |
| 5,155,858 | 10/1992 | DeBruler et al. | 395/200.01 |
| 5,282,275 | 1/1994 | André et al. | 395/421.1 |
| 5,319,753 | 6/1994 | MacKenna et al. | 395/868 |
| 5,428,799 | 6/1995 | Woods et al. | 395/739 |

FOREIGN PATENT DOCUMENTS

| | | |
|---|---|---|
| 60-010383 | 1/1985 | Japan . |
| 04-178869 | 6/1992 | Japan . |

*Primary Examiner*—Jack B. Harvey
*Assistant Examiner*—Jeffrey K. Seto
*Attorney, Agent, or Firm*—Staas & Halsey

[57] ABSTRACT

An interrupt process distributing system, provided in a CPU board in a loose-coupled type multiprocessor system formed of a plurality of CPU boards and one I/O board which are interconnected through common mediation and interrupt busses. A CPU executes interrupt requests; a queue counter, connected to the CPU through an internal bus, counts the interrupt requests which are sent from the common bus to and queued in the CPU. An interrupt transfer control unit, connected to the CPU and the queue counter through the internal bus, counts the interrupt requests as received from the interrupt bus, compares the number of queued interrupts with the number of received interrupt requests, and transfers the received interrupt requests to the CPU when the number of the received interrupt requests exceeds the number of queued interrupt requests.

23 Claims, 11 Drawing Sheets

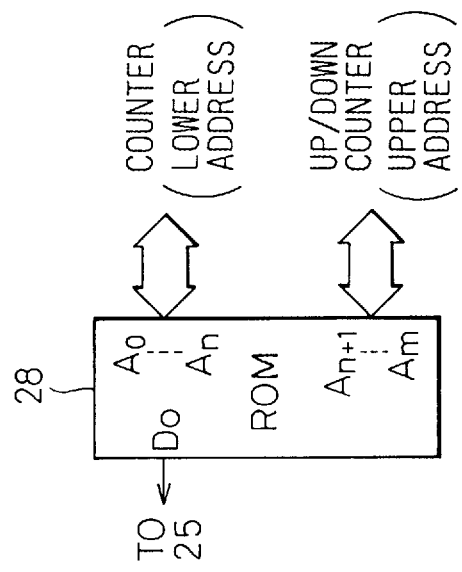
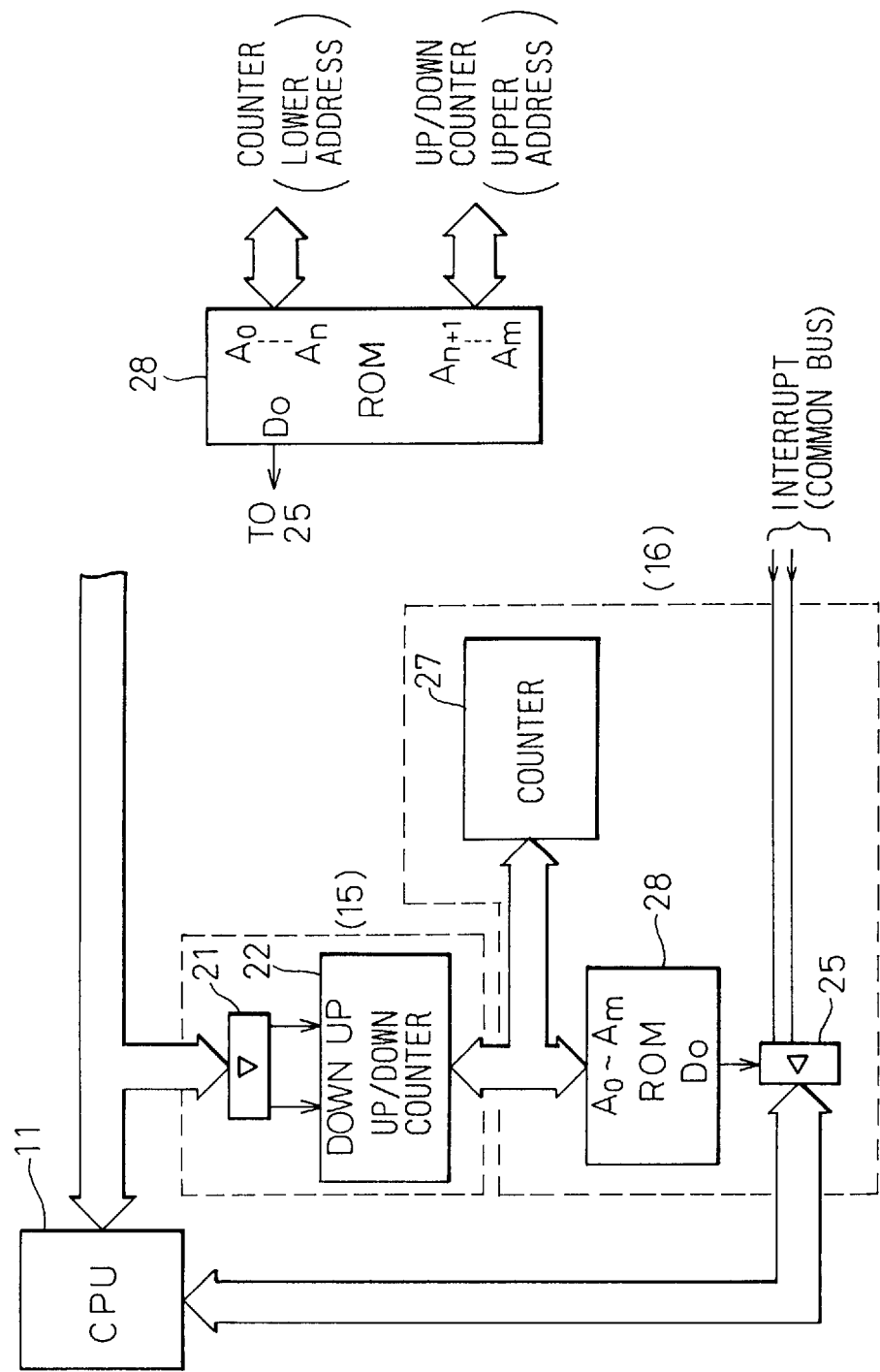

Fig.7

```
COUNT
VALUES          ( DATA IN ROM )
   ↓
ADDRESS    0  1  2  3  4  5  6  7  8  9  A  B  C  D  E  F 0 0 0 0    01 01 01 01 01 01 01 01 01 01 01 01 01 01 01 01

0 0 1 0    00 01 01 01 01 01 01 01 01 01 01 01 01 01 01 01

0 0 2 0    00 00 01 01 01 01 01 01 01 01 01 01 01 01 01 01
    ⋮                          ⋮
```

INTERRUPT PROCESS DISTRIBUTING SYSTEM

This application is a continuation, of application No. 08/300,942, filed Sept. 6, 1994 now abandoned.

BACKGROUND OF THE INVENTION

1. Field of the Invention

The present invention relates to an interrupt process distributing system provided in a CPU (central processing unit) board.

In a loose-coupled type multiprocessor system formed by a plurality of CPU boards and one I/O (input/output) board, the interrupt process distributing system according to the present invention can prevent convergence of the interrupt process at any one of the CPUs and can apply a uniform distribution of processing loads to all of the CPUs.

2. Description of the Related Art

In a loose-coupled type multiprocessor system, a plurality of CPU boards and one I/O board are connected through a common bus, a mediation bus and an interrupt bus. Each CPU board includes a CPU and can operate synchronously in accordance with its own program. When an interrupt request is passed from, for example, the I/O board, to all of the CPU boards in parallel through the common bus, any one of CPUs can receive the interrupt request, save its present program (or, instruction) into a stack frame, and execute a predetermined interrupt process.

In order to not overload a particular CPU, it is necessary to uniformly distribute the load between all the CPUs so that it is possible to raise the throughput of the multiprocessor system. The present invention aims to uniformly distribute the processing load between all the CPUs by preventing a convergence of the interrupt processes at any one of the CPUs, as explained in detail below.

SUMMARY OF THE INVENTION

The object of the present invention is to provide an interrupt process distributing system which can prevent convergence of interrupt processes at any one of the CPUs and can apply a uniform distribution of the processing load to all CPUs, so that it is possible to raise the throughput of the multiprocessor system.

In accordance with one aspect of the present invention, there is provided an interrupt process distributing system provided in a CPU (central processing unit) board in a loose-coupled type multiprocessor system which is formed by a plurality of CPU boards and one I/O (input/output) board which are connected through a common bus, a mediation bus and an interrupt bus, the interrupt process distributing system including:

a CPU for executing an interrupt request;

a queue counter, connected to the CPU through an internal bus, for counting queues for interrupt requests which are sent from the common bus to the CPU; and an interrupt transfer control unit, connected to the CPU and the queue counter through the internal bus, for counting the interrupt requests from the interrupt bus, comparing the number of queues with the number of interrupt requests, and transferring the interrupt requests to the CPU when the number of interrupt requests exceed the number of queues.

In a preferred embodiment, the queue counter comprises an up/down counter for counting periodically, increments and decrements of queues and the interrupt transfer control unit comprises an interrupt counter for counting the interrupt requests from the interrupt bus, and a comparator for comparing the number of queues with the number of the interrupt requests and transfering the interrupt requests to the CPU when the number of the interrupt requests exceed the number of the queues.

In another preferred embodiment, the queue counter comprises an up/down counter for counting periodically increments and decrements of queues and the interrupt transfer control unit comprises an interrupt counter for counting the interrupt requests from the interrupt bus, a ROM (read only memory) for storing predetermined data, and a buffer for controlling the transfer of the interrupt requests to the CPU. The queues and the interrupt requests are used as addresses for reading predetermined data from the ROM. A window of time for opening or closing the buffer to transfer the interrupt requests to the CPU is controlled in accordance with the the predetermined data read from the ROM.

In still another preferred embodiment, the interrupt requests in the interrupt counter are used as lower addresses in the ROM, and the queues in the up/down counter are used as upper addresses in the ROM.

In still another preferred embodiment, the queue counter comprises an up/down counter for counting, periodically, increments and decrements of queues and the interrupt transfer control unit comprises an interrupt counter for counting the interrupt requests from the interrupt bus, a RAM (random access memory) for storing predetermined data which are previously mapped in accordance with an operation state of the multiprocessor system, and a buffer for controlling the transfer of the interrupt requests to the CPU. The queues and the interrupt requests are used as addresses for reading the predetermined data from the RAM. A window of time for opening or closing the buffer to transfer the interrupt requests to the CPU is controlled in accordance with the predetermined data read from the RAM.

In accordance with another aspect of the present invention, there is provided an interrupt process distributing system provided in a CPU board in a loose-coupled type multiprocessor system which is formed by a plurality of CPU boards and one I/O board which are connected through a common bus, a mediation bus and an interrupt bus, the interrupt process distributing system including:

a CPU for executing an interrupt request;

an interrupt/vector-pre-fetch control unit connected to the CPU through an internal bus for controlling the interrupt requests to the CPU and for pre-fetching the vector from a request source for an interrupt process; and a first latch circuit provided in the interrupt/vector-pre-fetch control unit for latching the interrupt requests wherein, when the interrupt requests are input from the common bus to the interrupt/vector-pre-fetch control unit, the vector from the request source is pre-fetched into the first latch circuit, and the CPU receives the interrupt requests and saves an internal status (i.e., values of registers, a program counter etc.) into a stack frame and, further, receives the vector to start the interrupt process.

In still another preferred embodiment, the interrupt/vector pre-fetch control unit further comprises a timer unit for outputting various control signals after predetermined times, a bus mediation unit for mediating acquisition of the common bus, a first buffer unit for connecting the timer unit to the common bus, and a second latch circuit for controlling the relay of an interrupt signal sent to the CPU and the timer unit wherein, when the CPU is not in a halt state, the second latch circuit is opened and relays the interruption signal from the common bus to the CPU and the timer unit.

In still another preferred embodiment, when the CPU starts the interrupt process after the vector is latched into the first latch circuit, the second latch circuit is turned off and, when the CPU completes the interrupt process, the second latch circuit is turned on.

In still another preferred embodiment, the interrupt/vector-pre-fetch control unit further comprises a second buffer unit, connected between the second latch circuit and the CPU, for controlling the relay of the interrupt signal sent to the CPU and the timer unit and wherein, when an effective vector is latched into the first latch circuit, the second buffer unit is turned on to input the interrupt signal to the CPU. When the CPU saves the present program into the stack frame and generates the request of the vector to the request source, the vector which is latched in the first latch circuit is sent to the CPU.

BRIEF DESCRIPTION OF THE DRAWINGS

FIG. 6A is a detailed block diagram of a queue counter and an interrupt transfer control unit according to a third embodiment of the present invention;

FIG. 6B shows the detailed structure of a read only memory (ROM) shown in FIG. 6A;

FIG. 7 shows the detailed contents of the ROM shown in FIG. 6B;

DESCRIPTION OF THE PREFERRED EMBODIMENTS

Before describing the preferred embodiments, a conventional art and its problem will be explained below.

Figure 1:
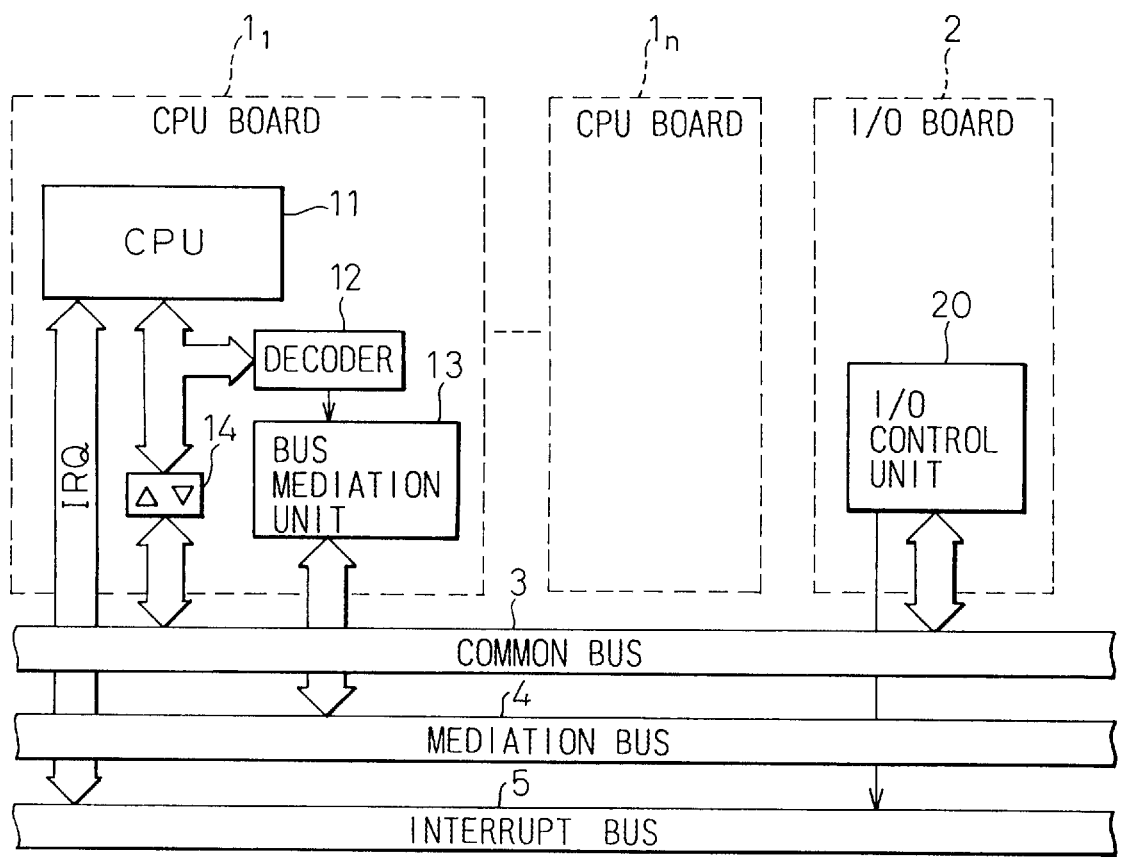
FIG. 1 is a schematic block diagram of a conventional interrupt process distributing system provided in a CPU board.

FIG. 1 is a schematic block diagram of a conventional interrupt process distributing system provided in a CPU board. As shown in the drawing, a loose-coupled type multiprocessor system consists of a plurality of CPU boards and one I/O board. In the drawing, each of the CPU boards $1_i$ to $1_n$ has a conventional interrupt process distributing system. Reference number 2 denotes an I/O board including an I/O control unit 20. Reference number 3 denotes a common bus, 4 a mediation bus, and 5 an interrupt bus. All of the CPU boards and the I/O board are connected in parallel through the common bus 3, the mediation bus 4, and the interrupt bus 5.

Each of the CPU boards $1_i$ to $1_n$ has a common structure, each CPU board including a CPU (central processing unit, i.e., processor) 11, a decoder 12, a bus mediation unit 13, and a buffer 14 connected to the CPU through an internal bus. Each decoder 12 decodes an address of the respective CPU board. The bus mediation unit 13 mediates a right of access, i.e., a right of use of the common bus 3.

An interrupt request IRQ is input from, for example, the I/O board 2, to all CPU boards $1_i$ to $1_n$ in parallel through the interrupt bus 5. When each CPU receives the interrupt request IRQ, the associated CPU 11 starts the interrupt process after saving of the present program (i.e., the program which the CPU currently is executing) into a stack frame, and sends a request for acquiring the common bus (i.e., an acquisition request) to the bus mediation unit 13. The CPU which acquires the right of access as a result of the mediation, receives an interrupt vector number from the I/O board 2 which is the source of the interrupt request, accumulates the interrupt process in a queue and completes the interrupt process.

The order of the interrupt process in the CPU is managed by an OS (operation system). The interrupt process is sequentially started in accordance with the reception of messages. When the CPU starts the interrupt process, it is masked from another interrupt process so that the CPU cannot recognize another (i.e. subsequent) interrupt process if one is input through the common bus.

Further, the interrupt request from the I/O board 2 is input to all CPU boards through the common bus 3, and each CPU executes a fetch operation for the vector in accordance with the following processes:

(1) The CPU completes the instruction which it is now executing.

(2) The CPU saves the internal status into the stack frame.

(3) The CPU starts the acquisition request to the common bus 3 in order to fetch the vector.

(4) The CPU fetches the vector, and starts the interrupt process. In this case, this interrupt process is executed solely by the CPU which acquired the right of use of the common bus 3 as a result of bus mediation, and other CPUs which do not obtain the right of use of the common bus 3 start an invalidation interrupt process, i.e., to invalidate the interrupt process.

Accordingly, if the same program is provided for all CPUs, and since the CPUs operate asynchronously, it is possible to distribute the times when the individual CPUs fetch the vector.

The operations in which the CPU detects the interrupt request (or, interrupt signal), saves the internal status into the stack frame and starts the interrupt program, are executed after completion of the present instruction which the CPU is executing. Accordingly, since the time when the present program is completed is different for each CPU, the respective times when the CPUs start the interrupt program are all different. Accordingly, if any one CPU executes a short program, and program is completed in a short time as a result, that CPU frequently receives interrupt processes from the I/O board 2. As a result, many interrupt processes converge on that CPU.

As another case, if one CPU executes an instruction which is completed in a few clock cycles, the time requested for the instruction is short as a result, the fetch operation of the next vector also becomes fast in that CPU. As a result, many interrupt processes are converged on that CPU.

Accordingly, the present invention aims to prevent convergence of the interrupt processes at any individual one of the plural CPUs and, instead, to apply a uniform distribution of loads to all the CPUs.

Figure 2:
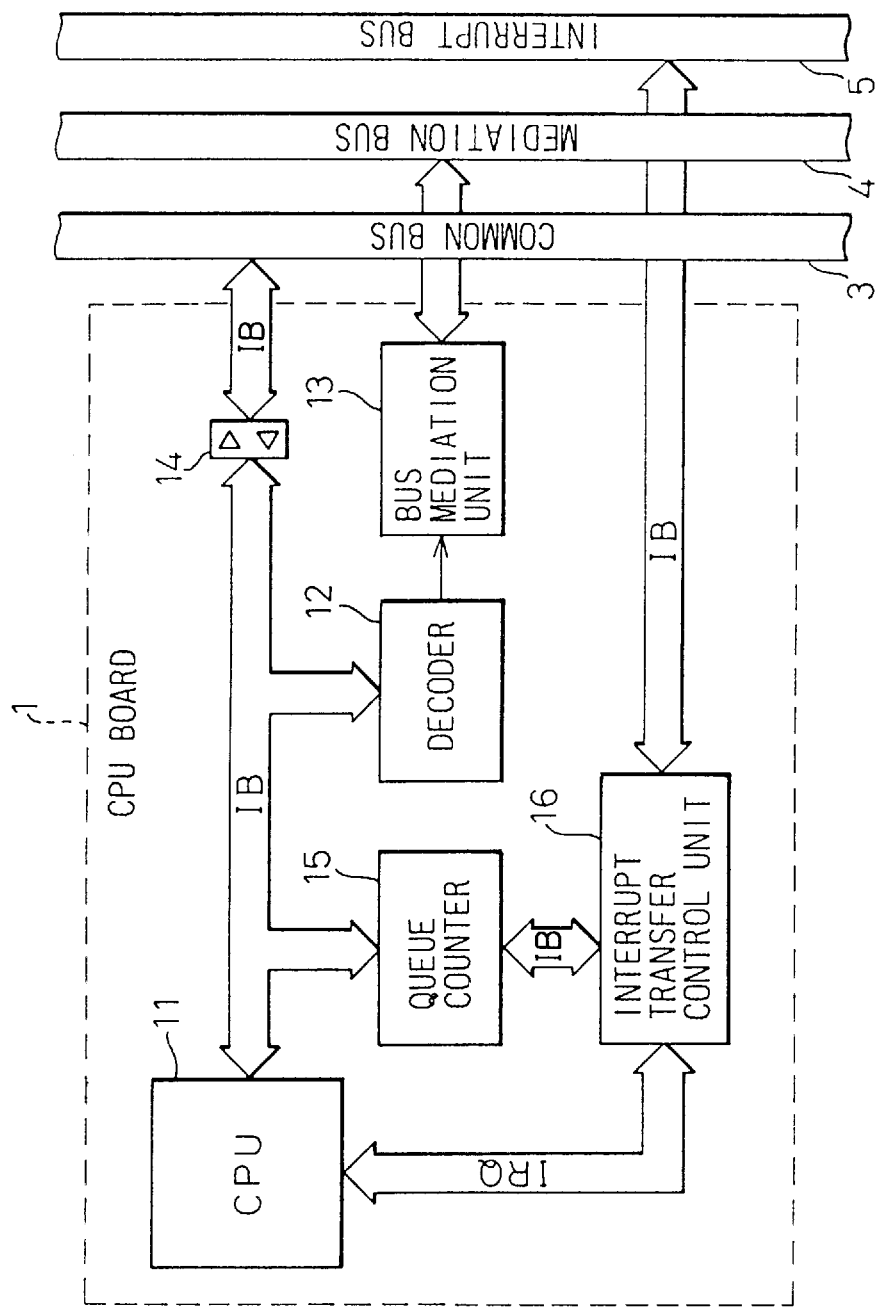
FIG. 2 is a basic block diagram of an interrupt process distributing system provided in a CPU board according to one aspect of the present invention.

FIG. 2 is a basic block diagram of an interrupt process distribution system provided in a CPU board 1 according to one aspect of the present invention. FIG. 2 uses the same reference numbers as used in FIG. 1 for the same components. The CPU board 1 further includes a queue counter 15 and an interrupt transfer control unit 16. The queue counter 15 is connected to the CPU 11 and to the interrupt transfer control unit 16 through the internal bus IB, and the interrupt transfer control unit 16 is also connected to the CPU 11 and the queue counter 15 through the internal bus IB.

The queue counter 15 is provided for counting the number of interrupt processes in the queue (i.e., the queued interrupt processes) and is controlled by the CPU 11 so as to count up or down in response respectively to an occurrence of a further and concurrently received, or a completion of an a previously received and queued interrupt process.

The interrupt transfer control unit 16 is provided for controlling the transfer time and the number of the interrupt signals which are input through the common bus 3 and transferred to the CPU 11 in accordance with a count value in the queue counter 15.

In this case, the queue counter 15 counts up when the CPU 11 starts an interrupt process, and accumulates the number of interrupt process in the queue. Further, the queue counter 15 counts down when the CPU 11 completes an interrupt process. Accordingly, the queue counter 15 holds the number of the queues which are accumulated i.e., the number of queued interrupt processes, in the present stage of operation.

As mentioned above, the interrupt transfer control unit 16 controls the transfer time and the number of interrupt signals which are input through the common bus 3 and transferred to the CPU 11 in accordance with the count value in the queue counter 15. That is, the interrupt transfer control unit 16 controls the transfer time and the number of interrupt signals in such a way that when the count value of the queue counter 15 increases, the number of further queues (i.e., queued interrupt process requests) can be decreased by limiting the further queues (i.e., current, or present) interrupts which currently can be sent to the CPU 11. Further, the number of queued requests and thus the number in the queue counter 15, can be decreased by setting a large delay time before the next interrupt is sent to the CPU 11.

Figure 3:
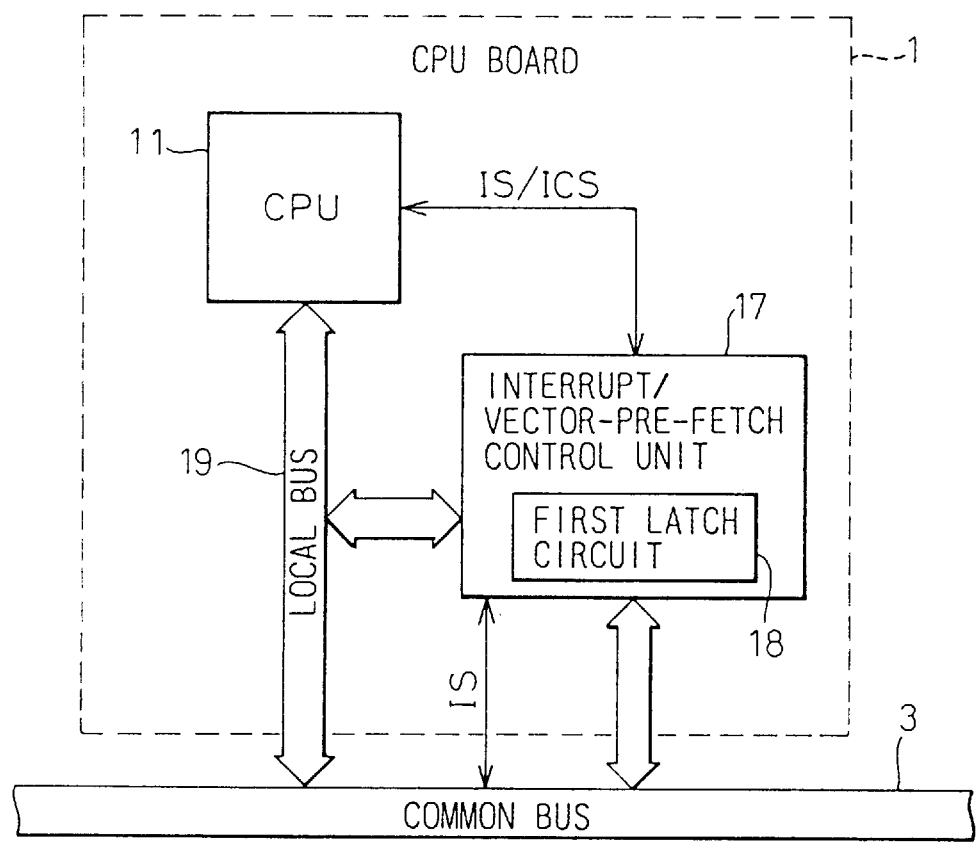
FIG. 3 is a basic block diagram of an interrupt process distributing system provided in a CPU board according to another aspect of the present invention.

FIG. 3 is a basic block diagram of an interrupt process distributing system provided on a CPU board 1 according to another aspect of the present invention. As is obvious, the CPU board 1 includes an interrupt/vector-pre-fetch control unit 17, a first latch circuit 18 provided therein, and a local bus 19.

The interrupt/vector-pre-fetch control unit 17 is connected to the common bus 3 and the local bus 19, and receives interrupt signals IS and interrupt control signals ICS from the CPU and the common bus 3. The latch circuit 18 is provided within the interrupt/vector-prefetch control unit 17 to execute the pre-fetch operation of the vector. Further, the interrupt/vector-pre-fetch control unit 17 outputs a request to use the common bus 3 to the CPU 11 after a predetermined time has elapsed from the input of the interruption signal through the common bus 3, and pre-fetches the vector number from the I/O board which is the source of the interrupt request. When each CPU outputs a request to use the common bus 3 to the control unit 17, after a predetermined time in synchronization with the input of the interrupt process, the interrupt vector is uniformly pre-fetched in each interrupt/vector-pre-fetch control unit 17. Since each CPU generates a request for the interrupt vector in response to the interrupt signal, the vector which is previously pre-fetched in the control unit 17 is sent to the CPU so that the CPU starts the interrupt process.

In FIG. 3, first, the interrupt signal is input from the common bus 3 to the interrupt/vector-pre-fetch control unit 17. When the CPU can accept the interrupt process, the interrupt/vector-pre-fetch control unit 17 outputs a request to use the common bus 3 after a predetermined time from the input of the interrupt signal. Further, when the interrupt/vector-pre-fetch control unit 17 starts the bus mediation and acquires the common bus 3, it pre-fetches the vector number from the I/O board. When the interrupt/vector-pre-fetch control unit 17 cannot acquire the common bus 3, it is set to invalidate the interrupt process.

In a bus-mediation method used in the present invention, it is assumed that a right of bus acquisition is uniformly given to each CPU. Since each CPU simultaneously outputs a request to use the common bus 3, after a predetermined time, to execute the pre-fetch of the vector in synchronization with the input of the interrupt request, the interrupt vector is pre-fetched uniformly into the interrupt/vector-pre-fetch control unit 17 of each CPU.

Simultaneously, since the interrupt/vector-pre-fetch control unit 17 of each CPU relays the interrupt signal to the CPU, the CPU saves the internal status into the stack frame, and generates the request of the interrupt vector after completion of the present program which it is currently executing. Accordingly, the vector, which was previously pre-fetched in the interrupt/vector-pre-fetch control unit 17, is sent to the CPU 11 so that the CPU starts the interrupt process. Accordingly, since the interrupt process is uniformly started in each CPU 11, it is possible to realize a uniform distribution of the load among all the CPUs.

Figure 4:
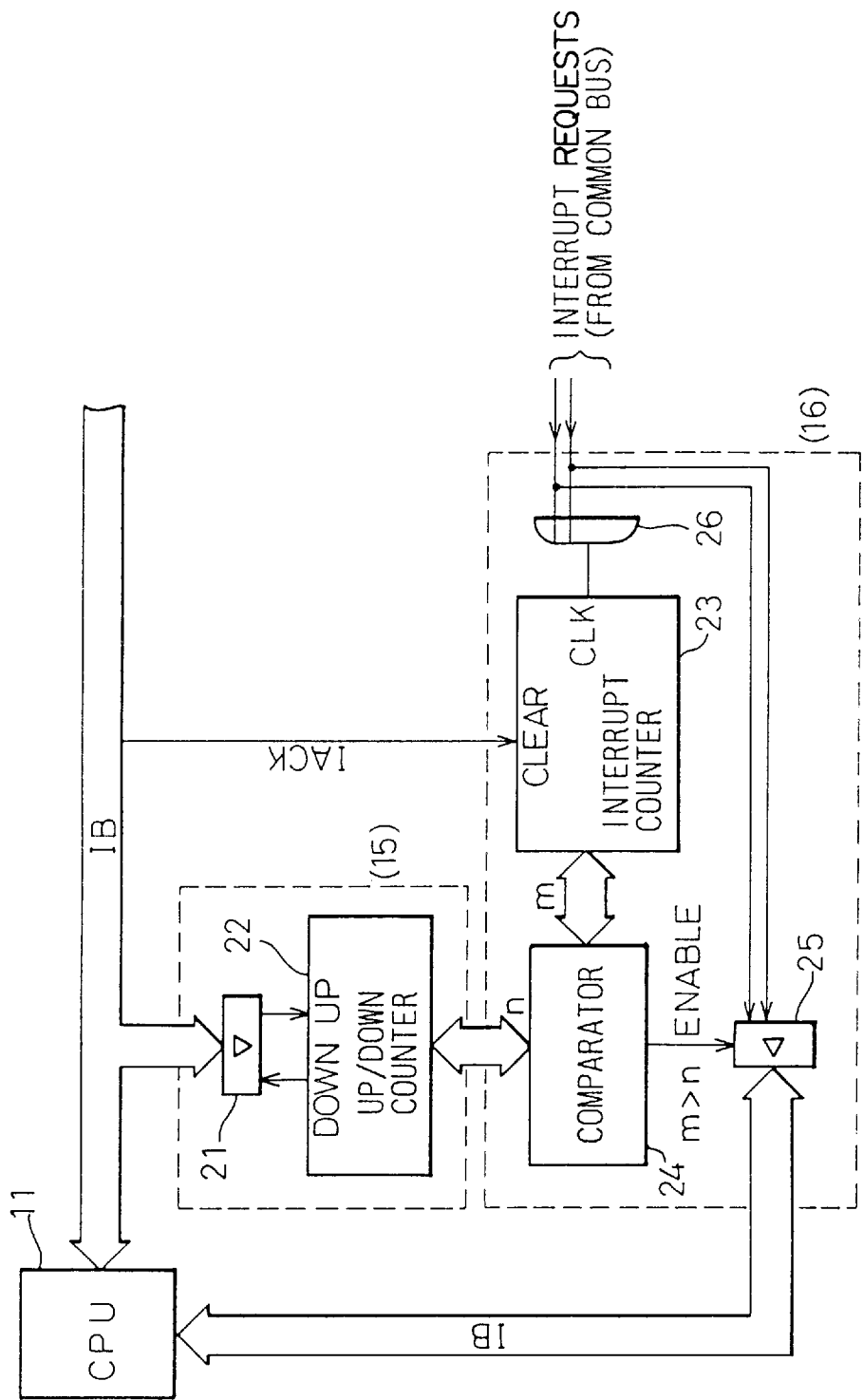
FIG. 4 is a detailed block diagram of a queue counter and an interrupt transfer control unit according to a first embodiment of the present invention.

FIG. 4 is a detailed block diagram of the queue counter and the interrupt transfer control unit according to a first embodiment of the present invention. The queue counter 15 includes a count control register 21 which outputs up-clock/down-clock signals in accordance with the occurrence or the completion of the, and an up/down counter 22 for counting the number of which accumulated therein. The interrupt transfer control unit 16 includes an interrupt counter 23 for counting the number of the interrupt requests on the common bus 3, a comparator 24 for comparing the count value of the up/down counter 22 with the count value of the interrupt counter 23, a gate 25 having two states, i.e., either "enable" or "disable" states, in accordance with the output of the comparator 24, and an OR circuit 26 outputting a logical sum of each interrupt signal from the common bus 3.

The CPU 11 controls the up/down counter 22 to count up when the CPU 11 receives and thus starts the interrupt process starts and accumulates the interrupt processes in the queue. Further, the CPU 11 controls the up/down counter 22 to count down when the CPU completes the interrupt process. Accordingly, the up/down counter 22 counts the number of the queued interrupt processes which are accumulated therein.

The interrupt counter 23 is counted-up when the interrupt request is input from the common bus 3 through the OR circuit 26. The comparator 24 compares the value (n) of the up/down counter 22 with the value (m) of the interrupt counter 23. When the value (m) is larger than the value (n) (i.e., m>n), the gate 25 is set to the enable state (i.e., is opened) to send the interrupt signal from the common bus 3 to the CPU 11. The interrupt counter 23 is reset by an interrupt acknowledge signal (IACK) when the CPU 11 starts the interrupt process.

Accordingly, when the interrupts are accumulated and reach the value "n", the number, in which the interrupt request is transferred to the CPU 11, becomes 1/(n+1) so that the transfer of the interrupt can be limited. Accordingly, it is possible to send the interrupt request to a CPU which has no load so that it is possible to uniformly distribute the load across all the CPUs.

Figure 5:
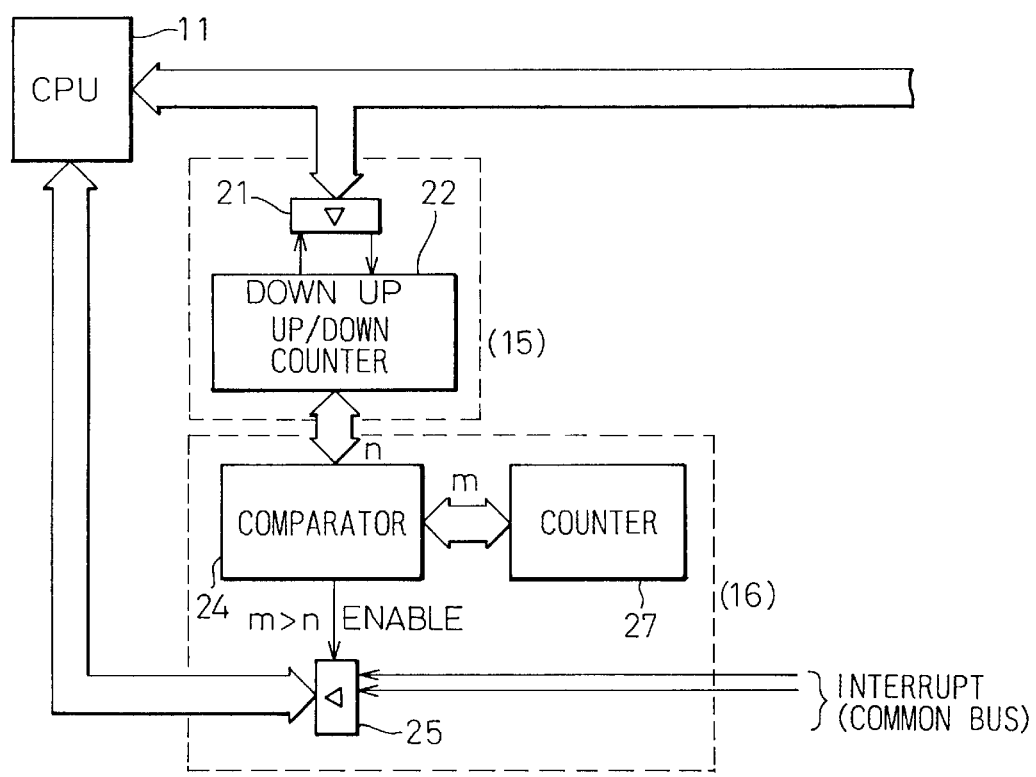
FIG. 5 is a detailed block diagram of a queue counter and an interrupt transfer control unit according to a second embodiment of the present invention.

FIG. 5 is a detailed block diagram of the queue counter and the interrupt transfer control unit according to a second embodiment of the present invention. The reference number 27 denotes a counter which periodically counts up to and counts down from a predetermined constant value. Although the up/down counter 22 of FIG. 3 counts the number of queued requests which are accumulated in the present stage, the counter 27 continuously and periodically repeats the count-up operation until the predetermined constant value and the count-down operation from the predetermined constant value. The comparator 24 compares the value (n) of the up/down counter 22 with the value (m) of the counter 27. When the value (m) is larger than the value (n) (i.e., m>n), the gate 25 is set to the enable state to send the interrupt signal from the common bus 3 to the CPU 11.

Accordingly, when the accumulated count value n of the queued requests increases, the window time, when the interrupt requests can be sent to the CPU 11, decreases such that the number of the interrupt requests which are input to the CPU 11 decreases. In the embodiment of FIG. 5, it remains more possible (i.e., a layer window exists) to send the interrupt processes to the CPU which has a relatively small load so that it is possible to uniformly distribute the load across all CPUs.

FIG. 6A is a detailed block diagram of the queue counter and the interrupt transfer control unit according to a third embodiment of the present invention, and FIG. 6B is a detailed structure of a read only memory (ROM) shown in FIG. 6A. Further, FIG. 7 is the detailed contents of the ROM shown in FIG. 6B. The ROM 28 accepts the values of the up/down counter 22 and the values of the counter 27 as addresses. That is, in the ROM 28, the count values of the counter 27 are input to the ROM 28 as the lower addresses (A0 to An), and the count values of the up/down counter 22 are input to the ROM 28 as the upper addresses (An+1 to Am). Accordingly, the ROM 28 generates the value $D_o$ which becomes sequentially "00" or "01" for every $\frac{1}{16}$ as a unit time. In FIG. 7, "A" is 10, "B" is 11, and "F" is 15. One cycle of the counter consists of sixteen steps (0 to 15) in this embodiment, and the counting operation is repeated from "0" to "F".

For example, when the count value of the counter 27 is "00", and when the count value of the up/down counter 22 is "00", (see, ADDRESS of FIG. 7), the output $D_o$ of the ROM 28 indicates "01" at all times, i.e., the steps "0" to "F" of FIG. 7, so that the gate 25 is always opened.

When the count value of the up/down counter 22 is "10" as the address (see, ADDRESS of FIG. 7), the output $D_o$ of the ROM 28 indicates "00" for the first $\frac{1}{16}$ step (i.e., "0" of FIG. 7) so that the gate 25 is closed in this time. The output $D_0$ becomes "01" from "1" to "F" of FIG. 7 so that the gate 25 is opened.

When the count value of the up/down counter 22 is "20" (see, ADDRESS of FIG. 7), the output $D_0$ of the ROM 28 is "00" for the first two of $\frac{1}{16}$ steps "0" and "1" of FIG. 7 so that the gate 25 is closed. The output $D_o$ becomes "01" from "2" to "F" of FIG. 7 so that the gate 25 is opened.

If the count value of the counter 27 is not "00", it is possible to determine the open/close condition of the gate 25 in the same way.

As explained above, by storing the data (00 or 01) shown in FIG. 7 into the ROM 28, in response to the increment or decrement of the count value of the counter 22, it is possible to increment or decrement the step when the gate 25 is enabled.

According to the embodiment of FIGS. 6A and 6B, the window time for transferring the interrupt signal to the CPU 11 can be shortened in accordance with interrupt the accumulation in the queues. As a result, it is possible to increase the probability that a CPU, which has no other load, accepts the interrupt process. Accordingly, it is possible to uniformly distribute the load of the interrupt processes across all CPUs.

Figure 8B:
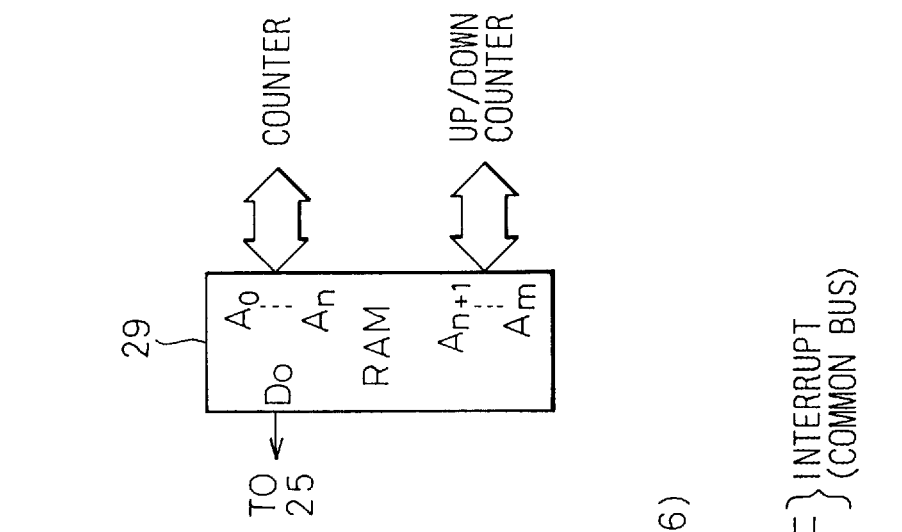
FIG. 8B shows the detailed structure of a ROM shown in FIG. 8A.
Figure 8A:
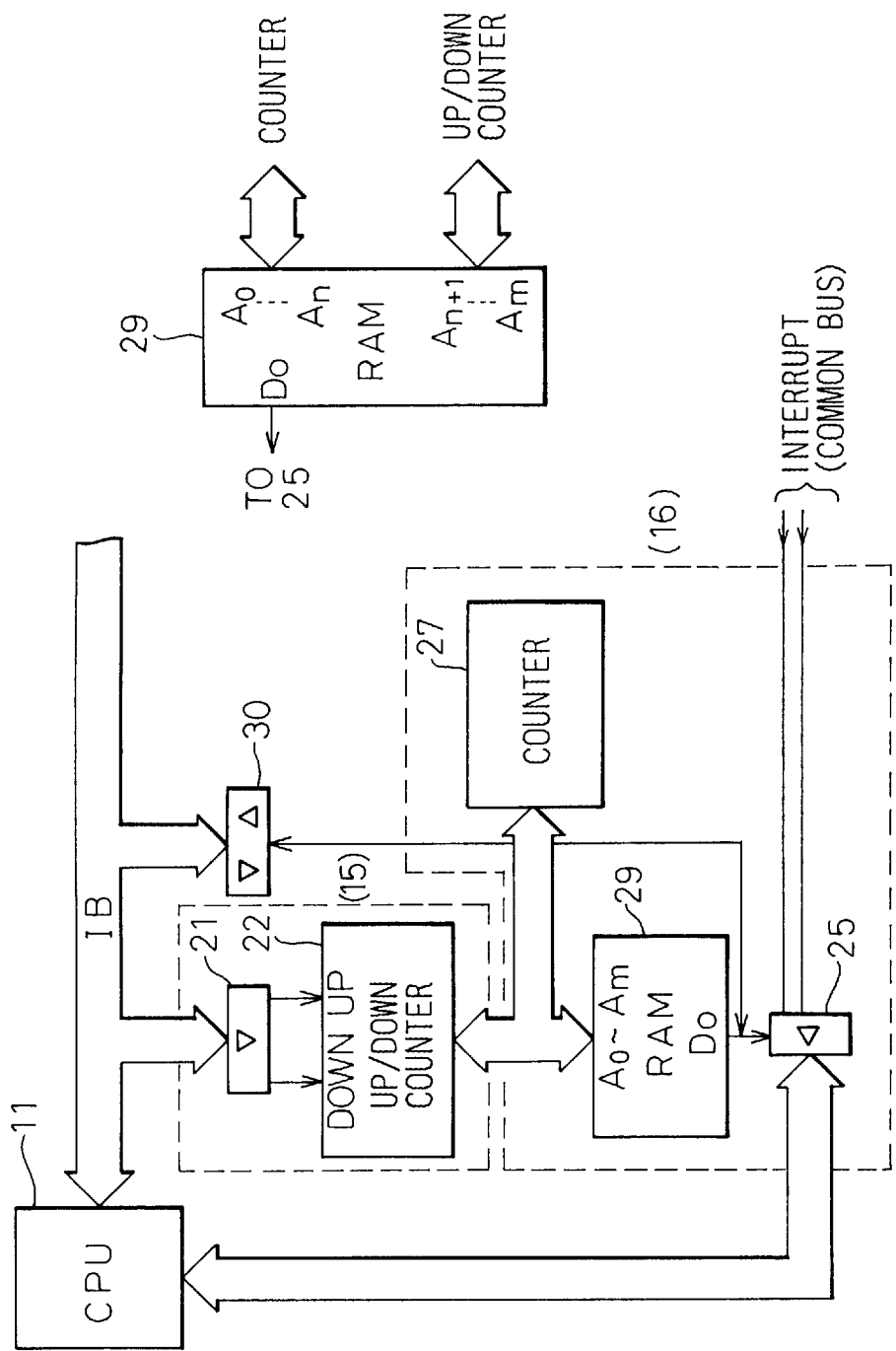
FIG. 8A is a detailed block diagram of a queue counter and an interrupt transfer control unit according to a fourth embodiment of the present invention.

FIG. 8A is a detailed block diagram of the queue counter and the interrupt transfer control unit according to a fourth embodiment of the present invention, and FIG. 8B shows the detailed structure of a read only memory (ROM) shown in FIG. 8A. Reference number 29 denotes a random access memory (RAM) which accepts the count values of the up/down counter 22 and the counter 27 as addresses. The same contents as the ROM 28 of FIG. 7B are previously mapped in the RAM 29. Reference number 30 denotes a two-way gate which connects the common bus to the RAM 29 in order to write the contents of the RAM 29.

As in the case of FIG. 4, the up/down counter 22 counts the number of the queues which are accumulated therein. The counter 27 repeats count-up/count-down operation until the predetermined constant counts periodically (for example, from "0" to "F" as shown in FIG. 7). The count values of the counter 27 are input to the RAM 29 as the lower addresses (A0 to An), and the count values of the up/down counter 22 are input to the RAM as the upper addresses (An+1 to Am). Accordingly, the RAM 29 generates the output $D_o$, which sequentially becomes "00" or "01", for every $\frac{1}{16}$ step as in as the case of FIG. 7.

In an initial process i.e., Initial Program Loader (for example, an IPL process) of the CPU board, the contents of the RAM 29 are previously mapped in accordance with the requirements, for example, of an application program. As a result, it is possible to increment or decrement the step when the gate 25 is enabled (i.e., opened/closed term, or tome duration) in response to increment or decrement of the up/down counter 22.

According to the embodiment of FIGS. 8A and 8B, the window time for transferring the interrupt signal to the CPU 11 can be shortened in accordance with the accumulation in the queues. As a result, it is possible to raise the probability that a CPU which has no other load will accept the interrupt process. Accordingly, it is possible to distribute the load of the interrupts over all CPUs.

Figure 9:
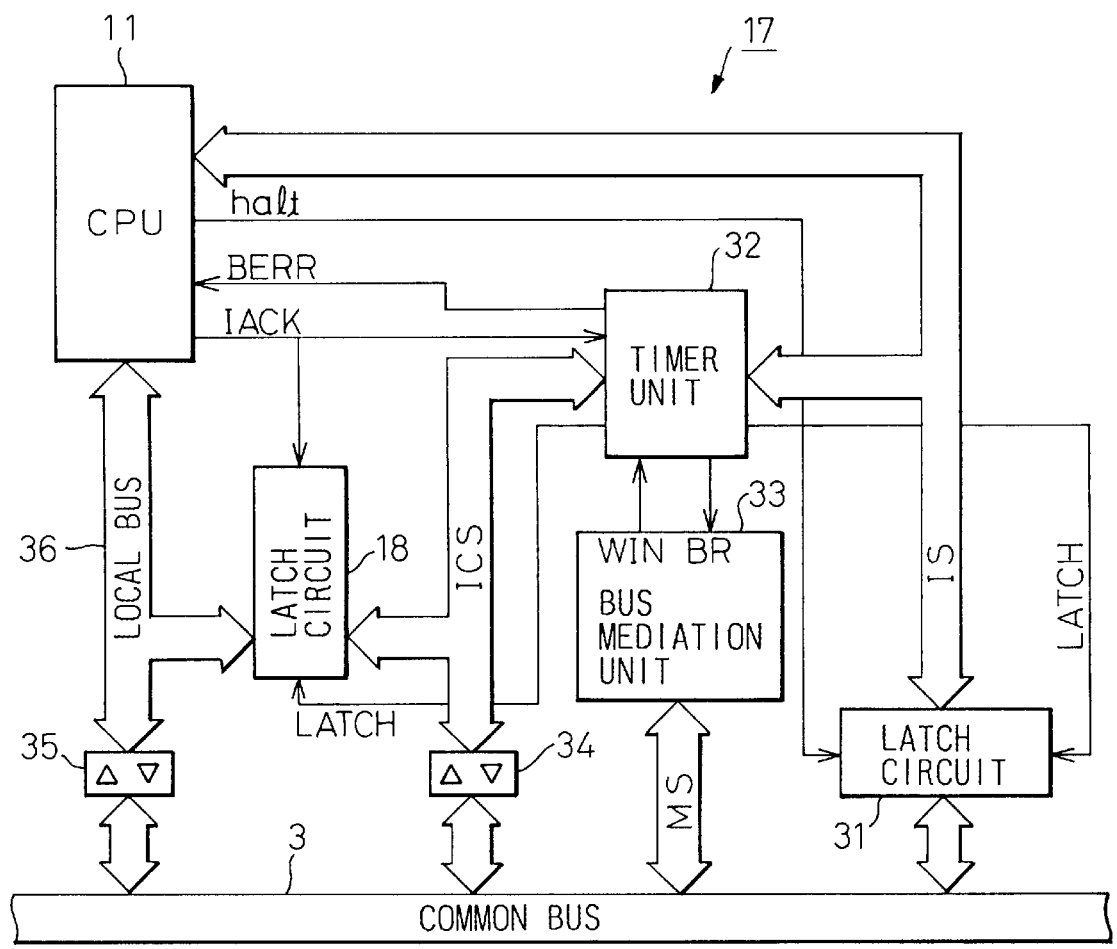
FIG. 9 is a detailed block diagram of an interrupt/vector-pre-fetch control unit according to a fifth embodiment of the present invention.

FIG. 9 is a detailed block diagram of the interrupt/vector-pre-fetch control unit according to a fifth embodiment of the present invention. This drawing shows the interrupt process for the CPU 11. In the drawing, reference number 31 denotes a latch circuit. Reference number 32 denotes a timer circuit which outputs various control signals after a predetermined time in accordance with the interrupt signal IS. Reference number 33 denotes a bus mediation unit for mediating acquisition of the common bus. Reference numbers 34 and 35 denote two-way buffers. Reference number 36 denotes a local bus.

When the CPU 11 can execute the interrupt process normally (i.e., the CPU is not halted), the second latch circuit 31 is opened and the interrupt signal is input to the timer circuit 32 and the CPU 11. The timer circuit 32 sends the bus request signal (BR) to the bus mediation unit 33 in order to acquire the common bus after the interrupt signal was input and a predetermined time has elapsed. The bus mediation unit 33 mediates acquisition of the common bus 3 by using a mediation signal (MS).

When the bus mediation unit 33 acquires the common bus 3, the timer circuit 32 sends the interrupt control signal ICS to the common bus 3 through the first two-way buffer 34 in accordance with a bus acquisition signal (WIN) from the bus mediation unit 33. As a result, the interrupt vector, which is sent from the I/O board (the source of the interrupt) through the common bus 3, is sent to the first latch circuit 18 through the two-way buffer 35 and the local bus 36. At that time, the interrupt signal is latched in the second latch circuit 31. The latch operation in the second latch circuit 31 is released when the CPU starts the interrupt process and generates the request for the interrupt vector.

Further, when the CPU 11 completes the saving process to the stack frame and fetches the interrupt vector, the CPU 11 sends the interrupt response signal (IACK) to the timer circuit 32. As a result, the interrupt vector which is latched in the first latch circuit 18 is sent to the CPU 11 through the local bus 36 so that the interrupt process is started by the CPU 11.

If the bus mediation unit 33 cannot acquire the common bus in the mediation step, the interrupt vector is not pre-fetched in the first latch circuit 18 because of an invalid interrupt. When the CPU 11 requests the interrupt vector, the timer circuit 32 returns a bus error signal (BERR) to the CPU 11 so that the CPU 11 starts the invalid interrupt process.

Figure 10:
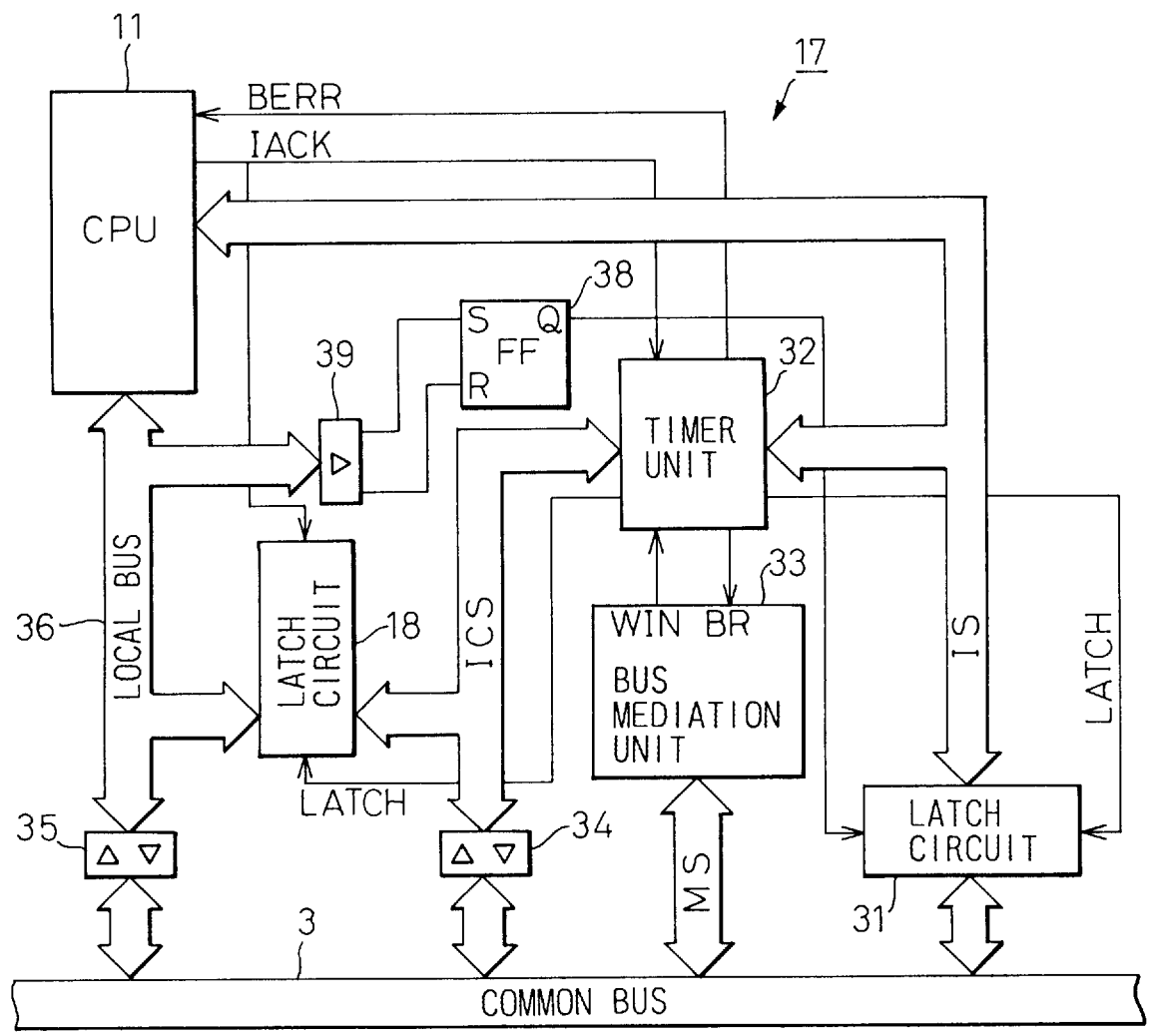
FIG. 10 is a detailed block diagram of an interrupt/vector-pre-fetch control unit according to a sixth embodiment of the present invention.

FIG. 10 is a detailed block diagram of the interrupt/vector-pre-fetch control unit according to a sixth embodiment of the present invention. The same reference numbers as used in FIG. 9 are attached to the same components in FIG. 10. Reference number 38 denotes a flip-flop circuit (FF), and reference number 39 denotes a buffer.

In FIG. 10, the pre-fetch of the interrupt vector and the passing of the vector to the CPU 11 are performed in the same way as in FIG. 9. In FIG. 10, the on/off control of the second latch circuit 31, which relays the interrupt signal from the common bus 3 to the timer circuit 32 and the CPU 11, is performed through the flip-flop (FF) 38. The set/reset control of the flip-flop circuit 38 is performed by software through the buffer 39.

When the CPU starts the interrupt process after reception of the interrupt vector, the second latch circuit 31 is turned off. When the CPU completes the interrupt process, the second latch circuit 31 is turned on. Accordingly, when there are many interrupt requests from the I/O board, the numbers of the CPUs which join the mediation are decreased for every occurrence of the interrupt request so that it is possible to precisely realize a distribution of the load.

Figure 11:
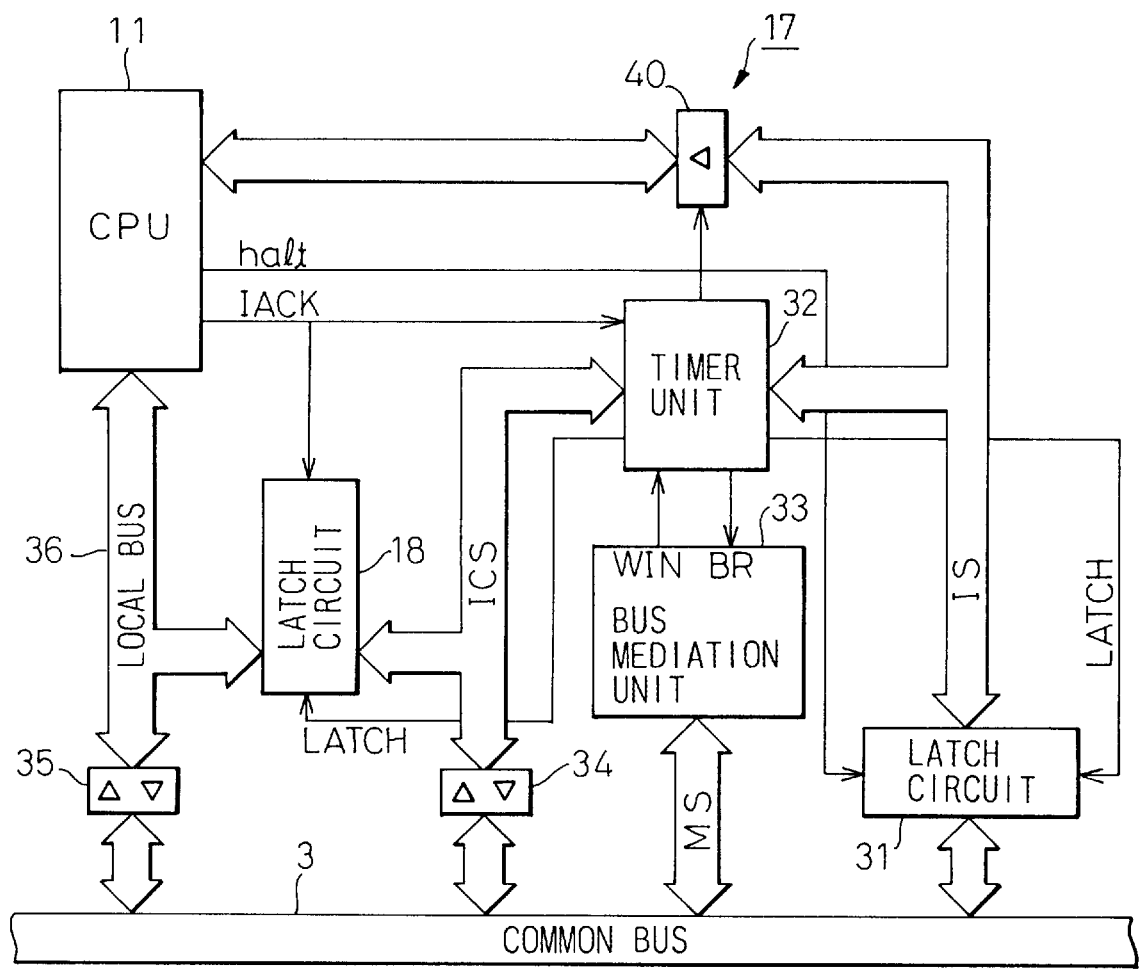
FIG. 11 is a detailed block diagram of an interrupt/vector-pre-fetch control unit according to a seventh embodiment of the present invention.

FIG. 11 is a detailed block diagram of the interrupt/vector-pre-fetch control unit according to a seventh embodiment of the present invention. The same reference numbers as used in FIG. 9 are attached to the same components in FIG. 11. Reference number 40 denotes a second one-way buffer used to relay the interrupt signal.

In this embodiment, the pre-fetch of the interrupt vector, and the information of the vector, sent to the CPU 11 (i.e., a method for notifying the vector to the "CPU") are performed in the same way as that of FIG. 9. In FIG. 11, the second buffer 40 is turned on when an effective vector is latched in the first latch circuit 18, and is turned off when the an effective vector is not latched in the first latch circuit 18.

Accordingly, when the interrupt signal is sent to the CPU 11, the CPU saves the internal status into the stack frame. When the CPU requests the vector, the latch circuit 31 can send the effective vector to the CPU 11. Accordingly, it is not necessary for the CPU to execute an invalid interrupt process and thus it is possible to improve the performance of the CPU.

I claim:

1. An interrupt process distributing system provided in a central processing unit (CPU) board in a loose-coupled type multiprocessor system having a plurality of CPU boards and one input/ output (I/O) board which are interconnected through a common bus, a mediation bus and an interrupt bus, said interrupt process distributing system comprising:

a CPU executing an interrupt request;

a queue counter, connected to the CPU through an internal bus, for counting interrupt requests which are sent from the common bus to the CPU and accumulated therein as queued interrupt requests; and an interrupt transfer control means, connected to the CPU and the queue counter through the internal bus, for receiving the interrupt requests from the interrupt bus and limiting a number of received interrupt requests to be sent to the CPU in accordance with the number of queued interrupt requests.

2. An interrupt process distributing system as claimed in claim 1, wherein:

said interrupt transfer control means comprises:

an interrupt counter which counts the received interrupt requests, as received from the interrupt bus, and resets the counted number of received interrupt requests when said CPU begins executing a queued interrupt request, and a comparator which compares the number of queued interrupt requests with the counted number of received interrupt requests and transfers a received interrupt request to the CPU when the counted number of the received interrupt requests exceeds the number of the queued interrupt requests.

3. An interrupt process distributing system as claimed in claim 1, wherein:

said interrupt transfer control means comprises:

a counter counting to a predetermined number, cyclically, a read only memory (ROM) for storing predetermined data, and a buffer for controlling transfer of the interrupt requests to the CPU;

the queues and the interrupt requests are used as addresses for reading the predetermined data from the ROM; and a window time, for opening or closing said buffer to transfer the interrupt requests to the CPU, is controlled in accordance with the predetermined data which are read from the ROM.

4. An interrupt process distributing system as claimed in claim 3, wherein:

the interrupt requests in the interrupt counter are used as lower addresses to access the ROM;

said queue counter comprises an up/down counter which counts up for each additional interrupt request accumulated in the CPU as a queued interrupt request and down for each queued interrupt request for which processing thereof by the CPU is completed; and the queues in the up/down counter are used as upper addresses to access the ROM.

5. An interrupt process distributing system as claimed in claim 1, wherein:

said interrupt transfer control means comprises a counter for counting to a predetermined number, cyclically, a random access memory (RAM) for storing predetermined data which are previously mapped in accordance with the operation state of the multiprocessor system, and a buffer for controlling the transfer of the interrupt requests to the CPU;

the queued and the received interrupt requests are used as addresses for reading the predetermined data from the RAM; and a window time, for opening or closing said buffer to transfer the interrupt requests to the CPU, is controlled in accordance with the predetermined data which are read from the RAM.

6. An interrupt process distrusting system as claimed in claim 1, wherein said interrupt transfer controller means comprises:

a cyclical counter counting to a predetermined number, cyclically; and a comparator which compares a number of queued interrupt requests by the queue counter with the counted number in said further counter and transfers a received interrupt request to the CPU when the counted number in said further counter exceeds the number of the queued interrupt requests.

7. An interrupt process distributing system provided in a central processing unit (CPU) board in a loose-coupled type multiprocessor system having a plurality of CPU boards and one in put/ output (I/O) board which are interconnected through a common bus, a mediation bus and an interrupt bus, said interrupt process distributing system comprising:

a CPU which executes an interrupt request;

an interrupt/vector-pre-fetch control means, connected to the CPU through an internal bus, for controlling the interrupt requests to the CPU and for pre-fetching the vector, from a request source, for an interrupt process;

first latch means, provided in the interrupt/vector-prefetch control means, for latching the interrupt requests; and when the interrupt requests are input from the common bus to the interrupt/vector-pre-fetch control means, the vector from the request source is pre-fetched into the first latch means and the CPU receives the interrupt requests and saves an internal status into a stack frame and then receives a vector, thereby to start the interrupt process.

8. An interrupt process distributing system as claimed in claim 7, wherein said interrupt/vector-pre-fetch control means further comprises:

timer means for outputting various control signals after a predetermined time;

bus mediation means for mediating acquisition of the common bus;

second latch means for controlling the relay of an interrupt signal sent to the CPU and the timer means; and when the CPU is not halted, the second latch means is opened and relays the interrupt signal from the common bus to the CPU and the timer means.

9. An interrupt process distributing system as claimed in claim 8, wherein:

when the CPU starts the interrupt process after the vector is latched into the first latch means, the second latch means is turned off; and when the CPU completes the interrupt process, the second latch means is turned on.

10. An interrupt process distributing system as claimed in claim 8, wherein said interrupt/vector-pre-fetch control means further comprises:

buffer means, connected between the second latch means and the CPU, for controlling the relay of the interrupt signal sent to the CPU and the timer means; and when an effective vector is latched into the first latch means, the buffer means is turned on thereby to input the interrupt signal to the CPU and, when the CPU completes the saving of the internal status into the stack frame and generates a request for the vector to the request source, the vector which is latched in the first latch means is sent to the CPU.

11. An interrupt process distributing system provided in a central processing unit (CPU) board in a loose-coupled type multiprocessor system having a plurality of CPU boards and one input/ output (I/O) board which are interconnected through a common bus, a mediation bus and an interrupt bus, said interrupt process distributing system comprising:

a CPU executing an interrupt request;

a queue counter, connected to the CPU through an internal bus, counting interrupt requests which are sent from the common bus to the CPU and accumulated therein as queued interrupt requests; and an interrupt transfer controller, connected to the CPU and the queue counter through the internal bus, receiving the interrupt requests from the interrupt bus and limiting a number of received interrupt requests to be sent to the CPU in accordance with the number of queued interrupt requests.

12. An interrupt process distributing system as claimed in claim 11, wherein said interrupt transfer controller comprises:

an interrupt counter which counts the received interrupt requests, as received from the interrupt bus, and resets the counted number of received interrupt requests when said CPU begins executing a queued interrupt request, and a comparator which compares the number of queued interrupt requests with the counted number of received interrupt requests and transfers a received interrupt request to the CPU when the counted number of the received interrupt requests exceeds the number of the queued interrupt requests.

13. An interrupt process distributing system as claimed in claim 11, wherein:

said interrupt transfer controller comprises:

a counter counting to a predetermined number, cyclically, a read only memory (ROM) storing predetermined data, and a buffer controlling transfer of the interrupt requests to the CPU;

the queues and the interrupt requests are used as addresses for reading the predetermined data from the ROM; and a window time, for opening or closing said buffer to transfer the interrupt requests to the CPU, is controlled in accordance with the predetermined data which are read from the ROM.

14. An interrupt process distributing system as claimed in claim 13, wherein:

the interrupt requests in the interrupt counter are used as lower addresses to access the ROM;

said queue counter comprises an up/down counter which counts up for each additional interrupt request accumulated in the CPU as a queued interrupt request and down for each queued interrupt request for which processing thereof by the CPU is completed; and the queues in the up/down counter are used as upper addresses to access the ROM.

15. An interrupt process distributing system as claimed in claim 11, wherein:

said interrupt transfer controller comprises a counter counting to a predetermined number, cyclically, a random access memory (RAM) storing predetermined data which are previously mapped in accordance with the operation state of the multiprocessor system, and a buffer controlling the transfer of the interrupt requests to the CPU;

the queued and the received interrupt requests are used as addresses for reading the predetermined data from the RAM; and a window time, for opening or closing said buffer to transfer the interrupt requests to the CPU, is controlled in accordance with the predetermined data which are read from the RAM.

16. An interrupt process distrusting system as claimed in claim 11, wherein said interrupt transfer controller comprises:

a cyclical counter counting to a predetermined number, cyclically; and a comparator which compares a number of queued interrupt requests by the queue counter with the counted number in said further counter and transfers a received interrupt request to the CPU when the counted number in said further counter exceeds the number of the queued interrupt requests.

17. An interrupt process distributing system provided in a central processing unit (CPU) board in a loose-coupled type multiprocessor system having a plurality of CPU boards and one input/output (I/O) board which are interconnected through a common bus, a mediation bus and an interrupt bus, said interrupt process distributing system comprising:

a CPU executing an interrupt request;

an interrupt/vector-pre-fetch controller, connected to the CPU through an internal bus, controlling the interrupt requests to the CPU and pre-fetching the vector, from a request source, for an interrupt process;

a first latch circuit, provided in the interrupt/vector-prefetch controller, latching the interrupt requests; and when the interrupt requests are input from the common bus to the interrupt/vector-pre-fetch controller, the vector from the request source is pre-fetched into the first latch circuit and the CPU receives the interrupt requests and saves an internal status into a stack frame and then receives a vector, thereby to start the interrupt process.

18. An interrupt process distributing system as claimed in claim 17, wherein said interrupt/vector-pre-fetch controller further comprises:

a timer outputting various control signals after a predetermined time;

a bus mediator mediating acquisition of the common bus;

a second latch circuit controlling the relay of an interrupt signal sent to the CPU and the timer; and when the CPU is not halted, the second latch circuit is opened and relays the interrupt signal from the common bus to the CPU and the timer.

19. An interrupt process distributing system as claimed in claim 18, wherein:

when the CPU starts the interrupt process after the vector is latched into the first latch circuit, the second latch circuit is turned off; and when the CPU completes the interrupt process, the second latch circuit is turned on.

20. An interrupt process distributing system as claimed in claim 18, wherein said interrupt/vector-pre-fetch controller further comprises:

a buffer, connected between the second latch means and the CPU, controlling the relay of the interrupt signal sent to the CPU and the timer; and when an effective vector is latched into the first latch circuit, the buffer is turned on thereby to input the interrupt signal to the CPU and, when the CPU completes the saving of the internal status into the stack frame and generates a request for the vector to the request source, the vector which is latched in the first latch circuit is sent to the CPU.

21. An interrupt process distributing system provided in a central processing unit (CPU) board in a loose-coupled type multiprocess system having plural CPU boards and one input/output board interconnected through associated buses and comprising:

a CPU;

a queue counter counting interrupt requests sent to the CPU and accumulated therein a s queued interrupt requests; and a controller, connected to the CPU and the queue counters, limiting a number of interrupt requests sent to the CPU, for execution by the CPU, in accordance with the number of queued interrupt requests.

22. An interrupt process distributing system as recited in claim 21, wherein the controller further comprises an interrupt counter which counts interrupt requests received over an interrupt bus and resets the counted number of received interrupt requests when the CPU begins executing a queued interrupt request.

23. An interrupt process distributing system as recited in claim 21, wherein the queue counter comprises said queue counter comprises an up/down counter which counts up for each additional interrupt request accumulated in the CPU as a queued interrupt request and down for each queued interrupt request for which processing there of by the CPU is completed.

* * * * *

UNITED STATES PATENT AND TRADEMARK OFFICE
CERTIFICATE OF CORRECTION

PATENT NO.: 5,805,883
DATED : September 8, 1998
INVENTOR(S): Hiroyuki SAITOH

It is certified that error appears in the above-identified patent and that said Letters Patent is hereby corrected as shown below:

Col. 1, line 25, delete "," (third occurrence).

Col. 2, line 8, change "periodically" to --, periodically,--;
line 16, delete "the" (second occurrence).

Col. 4, line 23, after "access" insert --,--;
line 56, change "in" to --by-- and change "the" (second occurrence) to --a given--;
line 64, change "and" to --the--.

Col. 5, line 3, after "short" insert --;--;
line 24, delete "an";
line 47, after "the" insert --number of--.

Col. 6, line 46, delete "the";
line 58, delete "starts".

Col. 8, line 45, change "tome" to --time--.

UNITED STATES PATENT AND TRADEMARK OFFICE
CERTIFICATE OF CORRECTION

PATENT NO. : 5,805,883
DATED : September 8, 1998
INVENTOR(S) : Hiroyuki SAITOH

It is certified that error appears in the above-identified patent and that said Letters Patent is hereby corrected as shown below:

Col. 11, line 17, change "distrusting" to --distributing--.

Col. 13, line 23, change "distrusting" to --distributing--.

Signed and Sealed this

Sixth Day of April, 1999

Attest:

Q. TODD DICKINSON

Attesting Officer

Acting Commissioner of Patents and Trademarks